United States Patent
Itou et al.

(10) Patent No.: US 9,817,707 B2
(45) Date of Patent: Nov. 14, 2017

(54) CONTROLLER FOR REDUCING POWER

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Akito Itou, Kariya (JP); Naoki Maeda, Nisshin (JP); Masayuki Tsuda, Nagakute (JP); Atsuko Yokoyama, Nagoya (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 106 days.

(21) Appl. No.: 14/886,336

(22) Filed: Oct. 19, 2015

(65) Prior Publication Data
US 2016/0117214 A1    Apr. 28, 2016

(30) Foreign Application Priority Data

Oct. 23, 2014  (JP) .................................. 2014-216434

(51) Int. Cl.
G06F 11/07    (2006.01)

(52) U.S. Cl.
CPC ...... *G06F 11/0757* (2013.01); *G06F 11/0706* (2013.01)

(58) Field of Classification Search
USPC .................................. 701/38.1, 38.2; 714/55
See application file for complete search history.

(56) References Cited

U.S. PATENT DOCUMENTS

| 6,411,872 B1 | 6/2002 | Fujita et al. | |
| 2007/0234078 A1* | 10/2007 | Nguyen | G06F 1/26 713/300 |
| 2013/0139018 A1* | 5/2013 | Takada | H04L 12/407 714/748 |
| 2013/0232349 A1* | 9/2013 | Oler | G06F 1/263 713/300 |

(Continued)

FOREIGN PATENT DOCUMENTS

| JP | H5-151029 A | 6/1993 |
| JP | 2004-326629 A | 11/2004 |

(Continued)

*Primary Examiner* — Kamini Patel
(74) *Attorney, Agent, or Firm* — Posz Law Group, PLC (57) ABSTRACT

A controller includes a microcomputer that operates in a normal mode or in a low power mode and communicates with an external device, a monitor circuit that monitors an operation state of the microcomputer based on a monitor signal output from the microcomputer, and a start circuit that controls a drive of the monitor circuit. Communication signals exchanged between the microcomputer and the external device include a dominant state and a recessive state, and the start circuit monitors the communication signals. When the communication signals in the low power mode of the microcomputer include the dominant state, the start circuit puts the monitor circuit in a monitoring state. When no monitor signal is input from the microcomputer to the monitor circuit that is operating in the monitoring state, the monitor circuit determines that an abnormality has occurred in the microcomputer.

15 Claims, 6 Drawing Sheets

(56) References Cited

U.S. PATENT DOCUMENTS

| | | | | |
|---|---|---|---|---|
| 2014/0245046 A1* | 8/2014 | Itou | ................... | H04L 12/40039 713/323 |
| 2015/0200825 A1* | 7/2015 | Jang | ................... | H04L 41/0672 370/216 |
| 2016/0098071 A1* | 4/2016 | Itou | .......................... | G06F 1/26 713/323 |
| 2016/0098077 A1* | 4/2016 | Itou | ....................... | G06F 1/3296 713/322 |

FOREIGN PATENT DOCUMENTS

| | | | |
|---|---|---|---|
| JP | 2009-116719 | A | 5/2009 |
| JP | 2010-200552 | A | 9/2010 |
| JP | 2011-123569 | A | 6/2011 |

* cited by examiner

CONTROLLER FOR REDUCING POWER

CROSS REFERENCE TO RELATED APPLICATION

The present application is based on and claims the benefit of priority of Japanese Patent Application No. 2014-216434, filed on Oct. 23, 2014, the disclosure of which is incorporated herein by reference.

TECHNICAL FIELD

The present disclosure generally relates to a controller including a microcomputer that communicates with an external device.

BACKGROUND INFORMATION

As disclosed in a patent document, Japanese Patent Laid-Open No. JP 2004-326629 A, (patent document 1) listed below, an abnormality monitoring device that monitors an abnormality of the microcomputer is known. The abnormality monitoring device includes an abnormality detector that detects an abnormality during a normal operation of the microcomputer and a standby disorder detector that detects a disorder during a standby time of the microcomputer.

The microcomputer outputs a watch dog pulse during the normal operation, and does not output the watch dog pulse during the standby time. Therefore, the abnormality detector determines that the microcomputer in the normal operation has an abnormality caused therein when the watch dog pulse is not input to the abnormality detector from the microcomputer for more than a preset period of time. The standby disorder detector determines that the microcomputer has a disorder caused therein when the watch dog pulse is input to the standby disorder detector from the microcomputer during the standby time of the microcomputer.

As described above, the standby disorder detector disclosed in the patent document 1 determines that the microcomputer has a disorder caused therein when the watch dog pulse is input to the standby disorder detector from the microcomputer during the standby time of the microcomputer. However, depending on a state of disorder of the microcomputer in the standby time, the microcomputer may possibly not output the watch dog pulse during the standby time (i.e., designated as a low power consumption mode, or a low power mode). Therefore, the abnormality monitoring device in the patent document 1 is not capable of detecting such a disorder of the microcomputer.

SUMMARY

It is an object of the present disclosure to provide a controller that is capable of detecting a disorder of the microcomputer in a low power mode when the microcomputer is not configured to output a monitor signal such as a watch dog pulse or the like.

In an aspect of the present disclosure, the controller includes a microcomputer that operates in a normal operation mode and a low power consumption mode that consumes less electric power than the normal operation mode and communicating with an external device. The controller also includes a monitor circuit monitoring an operation state of the microcomputer, and a start circuit controlling a drive of the monitor circuit. The microcomputer generates and outputs a pulse shape monitor signal in the normal operation mode to the monitor circuit. The pulse shape monitor signal indicates that the operation state of the microcomputer is normal. Also, the monitor circuit monitors the operation state of the microcomputer based on the monitor signal. Further, the pulse shape communication signals exchanged for communication between the microcomputer and the external device are in a dominant state or a recessive state. The dominant state of a communication signal indicates that the communication signal is a signal of significance, and the recessive state of the communication signal is continuously output when the communication is stopped. Also, the start circuit monitoring the pulse shape communication signals puts the monitor circuit in a monitoring state when the pulse shape communication signals in the low power consumption mode of the microcomputer include the dominant state. Further, the monitor circuit in the monitoring state determines that an abnormality has occurred in the microcomputer when no monitor signal is input to the monitor circuit.

The above-described one aspect may more practically be described as a second aspect in the following. That is, when the microcomputer is in the low power consumption mode and the communication signals include the dominant state, the start circuit (i) outputs a start signal to the microcomputer. The start signal instructs an execution of a start process for a transition of the microcomputer from the low power consumption mode to the normal operation mode, and (ii) puts the monitor circuit in the monitoring state. Also, when the monitor circuit in the monitoring state receives no monitor signal for at least a start process time that is required for completing the start process of the microcomputer from an output of the start signal to the microcomputer, the monitor circuit determines that that an abnormality has occurred in the microcomputer.

When the microcomputer is in the low power mode, the communication signals may include a dominant state in the following two scenarios. That is, when the external device output the communication signals to the microcomputer is operating in the low power consumption mode, the communication signals may include a dominant state, and when the microcomputer operating in the abnormal state outputs the communication signals to the external device, the communication signals may include a dominant state.

In the former scenario, the start signal that is output from the start circuit causes the microcomputer to transit to the normal operation mode within a start process time, and the microcomputer in the normal operation mode outputs the monitor signal to the monitor circuit. Therefore, the monitor circuit determines that the microcomputer has no abnormality.

However, in the latter scenario, the microcomputer in the abnormal state will not transit to the normal operation mode even when receiving the start signal from the start circuit, thereby not causing the microcomputer to output the monitor signal to the monitor circuit, and causing the monitor circuit to determine that the microcomputer is having an abnormality.

Therefore, as described above, even when the monitor signal is not outputted from the microcomputer, the abnormality of the microcomputer in the low power consumption mode is detectable.

Further, another abnormal state such as a communication between a certain Electronic Control Unit (ECU) in the external device, and the controller continuously occupying an entire communication bandwidth as a result of a continuous output of the dominant from the microcomputer is prevented by the above. That is, communication over the Local Interconnect Network (LIN) is always available for and guaranteed to the other ECU other than the certain ECU in the external device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiment of the present disclosure is described as a controller that serves as a control ECU for controlling a parking switch actuator.

First Embodiment

The controller of the present embodiment is described based on FIGS. 1-4. A controller 100 is a control ECU for controlling the drive of an actuator 200 of a parking switch, and the controller 100 is communicable with an external ECU 300 provided in the vehicle via LIN communication. The external ECU 300 may be an authorization ECU and/or a door ECU.

When a user who carries a key approaches the vehicle, the authorization ECU compares an authorization Identification (ID) memorized by the key with an authorization ID in the authorization ECU. When the ID in the key matches the ID in the ECU, the authorization ECU outputs a start instruction signal to the other ECU (i.e., to the door ECU, the controller 100 and the like) via LIN communication, for starting the operation of those ECU and controller. In such a state, when the user touches a touch sensor installed in the doorknob of the vehicle, the door ECU instructs a release of the lock to an actuator which locks the door of the vehicle. Then, upon having an input of a parking release instruction from the user, the controller 100 instructs a release of the lock to the actuator 200, for releasing the lock of a ring gear that is connected to an axle.

Figure 2:
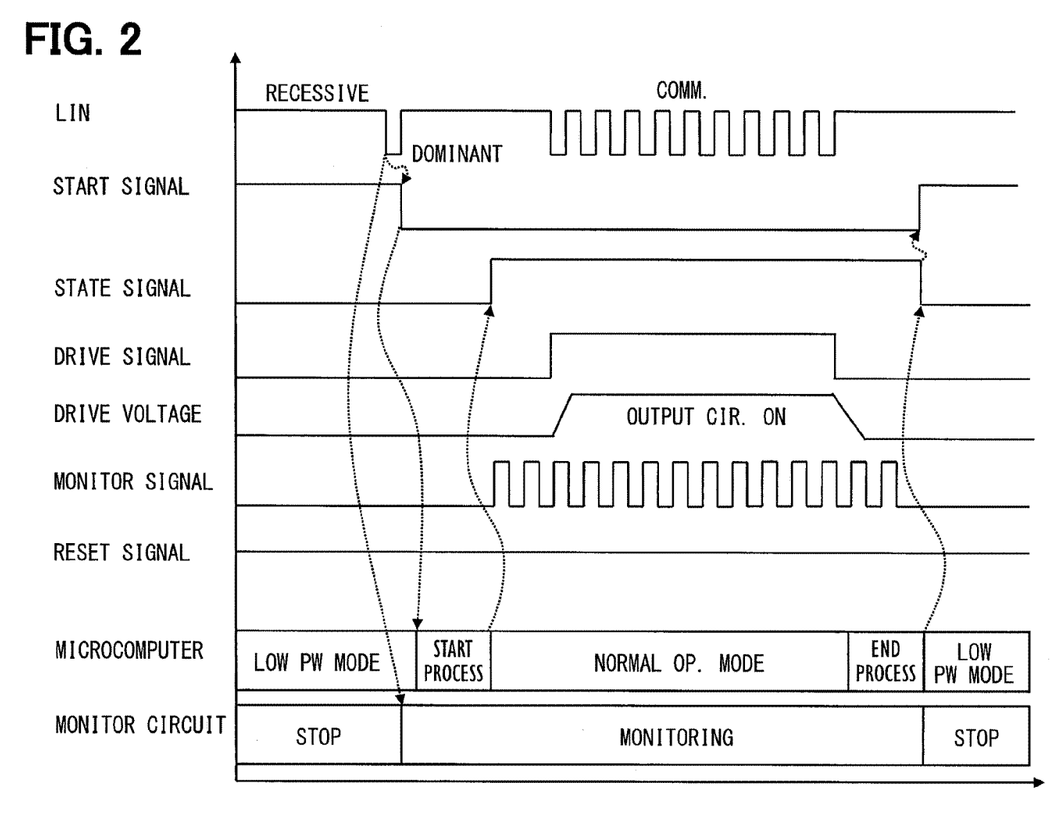
FIG. 2 is a timing chart of a signal and a state of the controller in a normal operation time.

The pulse signal (i.e., communication signals) used (i.e., being input and output) in the communication between the external ECU 300 and a microcomputer 10 of the controller 100 shown in FIG. 2 includes a dominant state and a recessive state. The voltage level of the dominant state is lower than voltage level of the recessive state, and the recessive state is continuously output when the communication is stopped, and the dominant is included in a signal of significance (e.g., a start signal or the like).

The above-mentioned actuator 200 corresponds to an external element, and the external ECU 300 corresponds to an external device.

Figure 1:
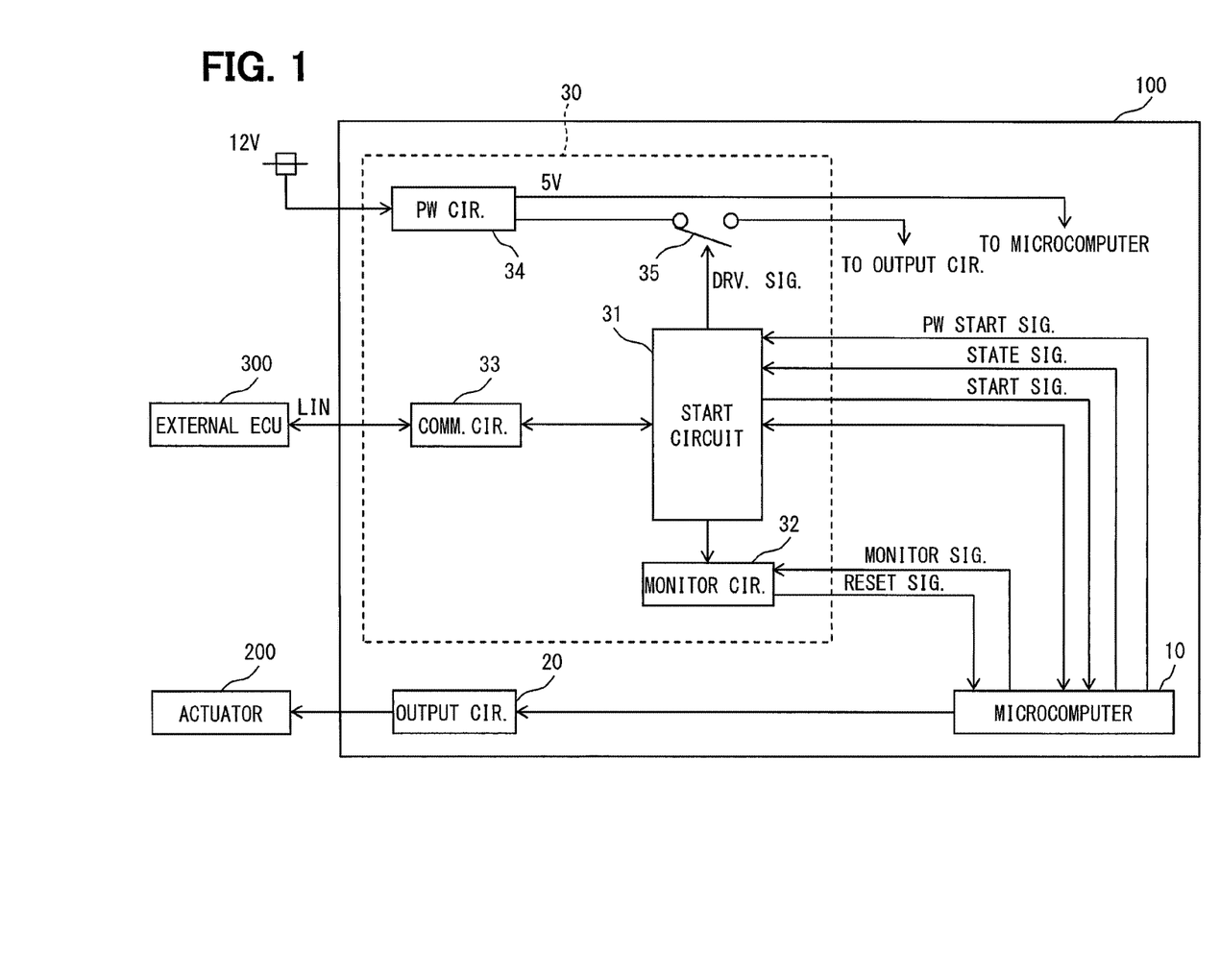
FIG. 1 is a block diagram of a controller in a first embodiment of the present disclosure.

As shown in FIG. 1, the controller 100 includes the microcomputer 10, an output circuit 20, and a power supply Integrated Circuit (IC) 30.

The microcomputer 10 performs LIN communication with the external ECU 300 as described above, outputs a control signal to the actuator 200 via the output circuit 20, and controls the operation of the actuator 200.

The microcomputer 10 and the power supply IC 30 respectively operate in two modes (i.e., in a normal operation mode for the communication with the external ECU 300, and in a low power mode in which power consumption by their operation is lower than the normal operation mode).

When the microcomputer 10 and the power supply IC 30 respectively receive a start instruction signal instructing a start of operation from the external ECU 300 during the operate in the low power mode, which include a dominant state shown in FIG. 2, the power supply IC 30 transits to the normal operation mode and outputs a start signal to the microcomputer 10 to perform a start process. In other words, as shown in FIG. 2, the voltage level of the start signal is changed from Hi level to Lo level. Thereby, the microcomputer 10 performs a start process and transits to the normal operation mode from the low power mode.

When the microcomputer 10 ends LIN communication with the external ECU 300 and finishes the output of the control signal to the actuator 200, the microcomputer 10 performs an end process which transits to the low power mode from the normal operation mode. Thereby, the microcomputer 10 transits to the low power mode. The microcomputer 10 is configured to generate and output, to the power supply IC 30, a state signal from the microcomputer 10 itself, indicating with such a state signal that the microcomputer 10 is operating in the normal operation mode or in the low power mode.

In the above-mentioned low power mode, the microcomputer 10 and the power supply IC 30 are respectively driven with their drive power lowered to a level, in which the temporary-stored data in a volatile memory in each of the microcomputer 10 and the power supply IC 30 is at least maintained (i.e., is kept un-erased).

In the present embodiment, the voltage level of the state signal is in Hi level in the normal operation mode, and is in Lo level in the low power mode. Further, while performing the end process, the voltage level of the state signal is in Hi level, and, during performing the start process, the voltage level of the state signal is in Lo level.

When the power supply IC 30 receives the state signal that indicates a low power mode (i.e., Lo level) when the IC 30 is operating in the normal operation mode, the IC 30 transits to the low power mode. In other words, the power supply IC 30 transits to the low power mode, when a falling edge of the state signal is input to the power supply IC 30. In such manner, the power supply IC 30 ends the output of the start signal as shown in FIG. 2.

As shown in FIG. 1, the power supply IC 30 includes a start circuit 31, a monitor circuit 32, a communication circuit 33, a power supply circuit 34, and a switch 35.

The start circuit 31 controls a starting of the microcomputer 10 and the drive of the monitor circuit 32, and the monitor circuit 32 monitors the state of the microcomputer 10.

The communication circuit 33 is a LIN transceiver for performing LIN communication with the external ECU 300 and the microcomputer 10, and the power supply circuit 34 is a voltage regulator for converting a battery voltage to a predetermined fixed voltage.

The switch 35 controls an input of the fixed voltage (i.e., a drive voltage) from the power supply circuit 34 to a periphery circuit of the microcomputer 10, such as the output circuit 20.

Hereafter, each of those components in the controller 100 is described individually.

As shown in FIGS. 1 and 2, the microcomputer 10 generates a pulse shape monitor signal when operating in the normal operation mode, and outputs the monitor signal to the monitor circuit 32. The monitor signal is a watch dog signal having a fixed pulse cycle and duty ratio, more practically.

The monitor circuit 32 monitors the state of the microcomputer 10 based on the monitor signal, and, when determining that the abnormality has occurred in the microcomputer 10, the monitor circuit 32 outputs a reset signal to the microcomputer 10. When the reset signal is input to the microcomputer 10, the microcomputer 10 performs a start process and will reboot. In such manner, even when an abnormal state has occurred in the microcomputer 10, the microcomputer 10 returns to a normal state.

Further, the microcomputer 10 is configured to generate a drive signal which controls the drive of the switch 35, and outputs the drive signal to the switch 35 via the start circuit 31, as shown in FIGS. 1 and 2.

When the voltage level of the drive signal transits to Hi level from Lo level, the switch 35 is put in the driving state and the output voltage of the power supply circuit 34 is supplied to the output circuit 20 via the switch 35. In such manner, the voltage (i.e., the drive voltage) supplied to the output circuit 20 rises, and the output circuit 20 is put in an ON state. As a result, the control signal generated by the microcomputer 10 is output via the output circuit 20 to the actuator 200. The above-mentioned the drive signal corresponds to a "power signal."

As shown in FIG. 2, when the dominant state is included in the communication signals in the low power mode, the start circuit 31 transits to the normal operation mode from the low power mode, and changes the voltage level of the start signal from Hi level to Lo level. In such manner, the microcomputer 10 is controlled to perform the start process, and transits to the normal operation mode from the low power mode. In the present embodiment, the voltage level of the start signal described above is fixedly set to Lo level when the microcomputer 10 is operating in a mode other than the low power mode.

Further, when the dominant state is included in the communication signals in the low power mode, the start circuit 31 controls the monitor circuit 32 to transit from a stop state to a monitoring state, as shown in FIG. 2. Then, after the transition of the voltage level of the state signal from Hi level to Lo level, the start circuit 31 controls the monitor circuit 32 to transit from the monitoring state to the stop state.

The start circuit 31 controls the monitor circuit 32 to transit to the monitoring state not only when the microcomputer 10 is operating in the normal operation mode, but also when the microcomputer 10 is performing the start process or the end process. In other words, when one of the following three states is observed, the start circuit 31 controls the monitor circuit 32 to transit to the monitoring state: i) the communication signals are being input/output, ii) the state signal is in Hi level, or iii) the drive signal is in Hi level.

Further, when both of the state signal and the drive signal are in Lo level during an input or an output of the communication signals, the start circuit 31 controls the monitor circuit 32 to transit to the stop state after a lapse of a preset period of time from an end of the input/output of the communication signals.

Figure 3:
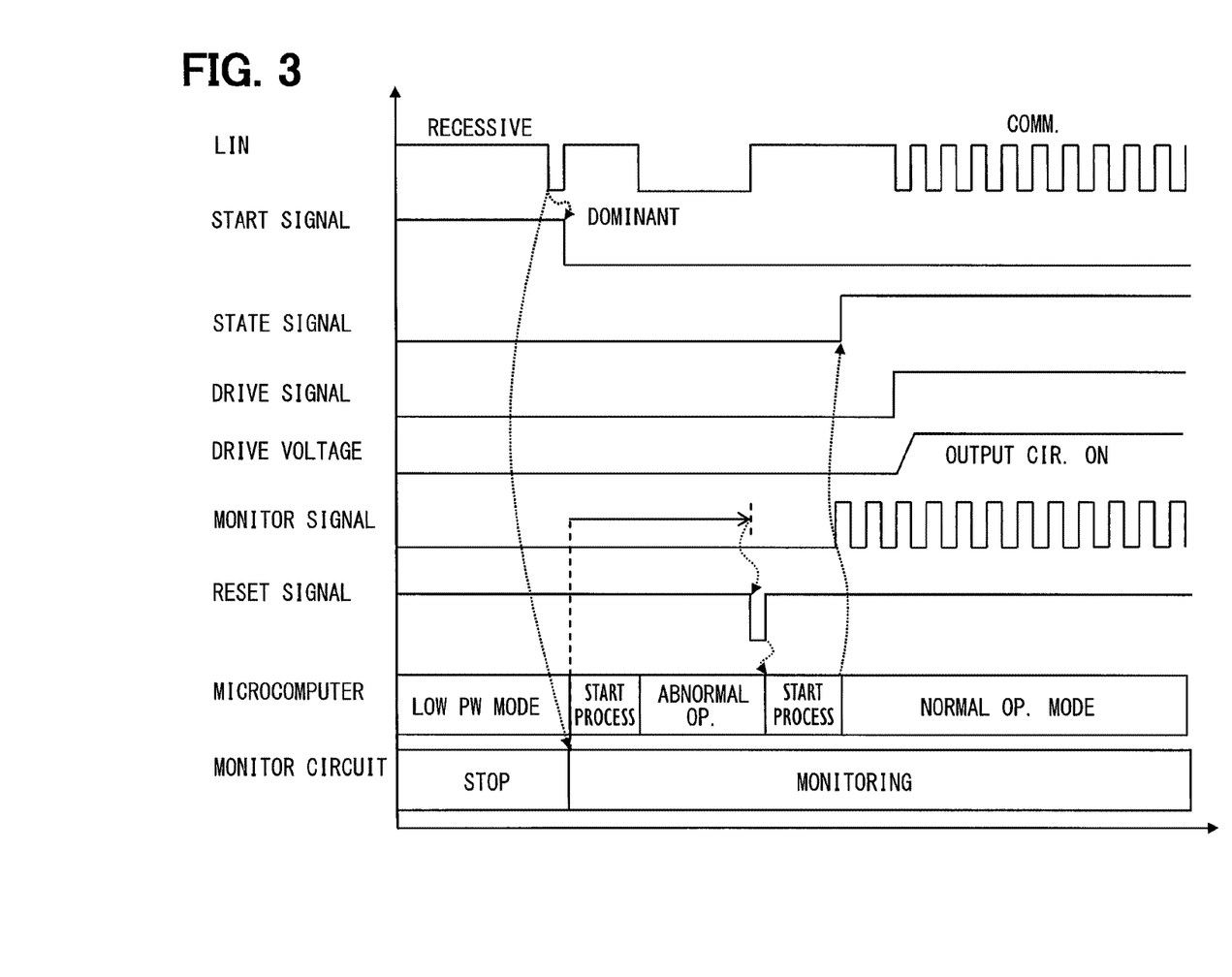
FIG. 3 is a timing chart of a signal and a state of the controller when an abnormality has occurred during a start process (for starting the microcomputer)
Figure 4:
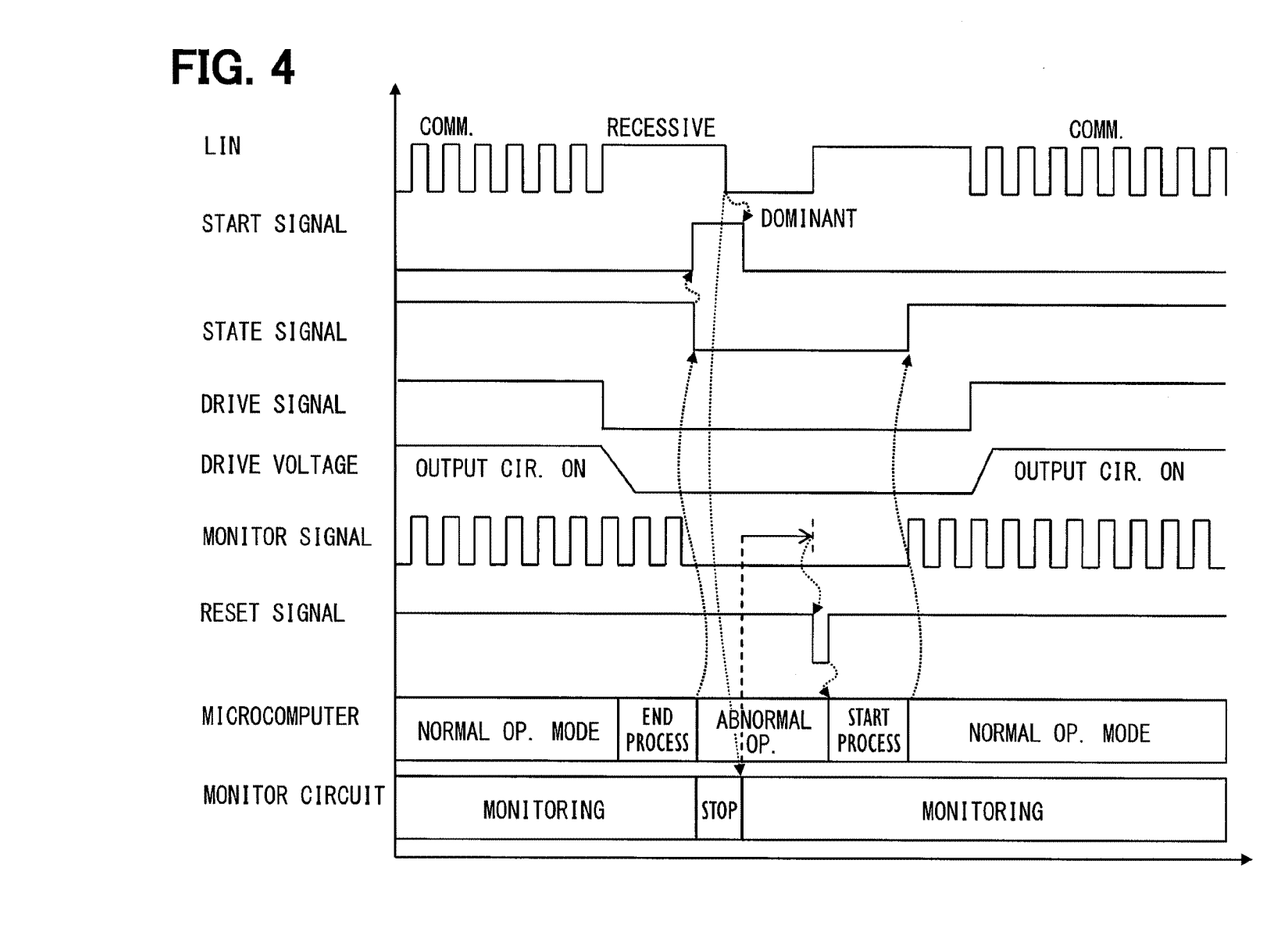
FIG. 4 is a timing chart of a signal and a state of the controller when the abnormality has occurred in a low power mode.

The start circuit 31 monitors the communication signals. As described above, the microcomputer 10 outputs and inputs the communication signals including the dominant and the recessive in the normal operation mode to and from the external ECU 300. However, the microcomputer 10 does not include the dominant state in the communication signals in the low power mode and when performing the start process. Therefore, as shown in FIG. 3, when the dominant state is included in the communication signals at the time of performing the start process, for example, the abnormality is suspected, (i.e., may possibly be occurring) in the microcomputer 10. Further, as shown in FIG. 4, when the dominant state is included in the communication signals in the low power mode, the abnormality may also possibly be occurring in the microcomputer 10.

Therefore, at the time of performing the start process, the microcomputer 10 controls the monitor circuit 32 to transit to the monitoring state for detecting the abnormality of the microcomputer 10, and the microcomputer 10 controls the monitor circuit 32 to transit to the monitoring state when the dominant state is included in the communication signals in the low power mode.

Thereafter, the start circuit 31 outputs the start signal, and enables the microcomputer 10 to output the monitor signal. In case that the microcomputer 10 is normal, the monitor signal is outputted from the microcomputer 10, and in case that the microcomputer 10 has the abnormality, the monitor signal will not be outputted from the microcomputer 10. Therefore, by controlling the monitor circuit 32 to transit to the monitoring state as mentioned above, the monitor circuit 32 is used to determine the state of the microcomputer 10.

As described above, the monitor circuit 32 is put in the monitoring state, when the start circuit 31 outputs the start signal. For example, as shown in FIG. 3, in case that the microcomputer 10 operates abnormally at the time of performing the start process, and does not output the monitor signal to the monitor circuit 32, even after a start process time that is a required period of time for completing the start process of the microcomputer 10, the monitor circuit 32 determines that an abnormality has occurred in the microcomputer 10. Further, as shown in FIG. 4, when the dominant state is included in the communication signals that are output from the microcomputer 10 in the low power mode, the start circuit 31 puts the monitor circuit 32 in the monitoring state. Then, the start signal is outputted to the microcomputer 10 from the start circuit 31.

In such case, when no monitor signal is input from the microcomputer 10 for at least a lapse of the start process time (i.e., after the start of the start process), the monitor circuit 32 determines that an abnormality has occurred in the microcomputer 10. Further, the monitor circuit 32 operates in the monitoring state when the microcomputer 10 is in the normal operation mode or is performing the end process.

Although not illustrated, even when the monitor signal is not input from the microcomputer 10 after a lapse of a preset time (e.g., after 30 msec), the monitor circuit 32 determines that an abnormality has occurred in the microcomputer 10.

As described above, the monitor circuit 32 determines, in the monitoring state, whether the microcomputer 10 is in the normal state or in the abnormal state according to whether the monitor signal is input from the microcomputer 10.

As described above, when it is determined that the abnormality has occurred in the microcomputer 10, the monitor circuit 32 changes the voltage level of the reset signal from Hi level to Lo level, and resets the microcomputer 10. Further, a threshold time for determining whether the monitor signal has been input or not is different for the start process and in the low power mode and for the other situations. Such a switching of the two threshold times has occurred based on an input of a signal that is transmitted from the start circuit 31 to the monitor circuit 32. However, using the only one threshold time for both (i.e., for the determination of the lapse of the start process time and for the determination of the lapse of the preset time of 30 msec.) may also be possible. That is, no threshold time switching is performed in such case.

When the voltage level of the state signal is Hi level (i.e., when the microcomputer 10 is in the normal operation mode, or is performing the end process), the monitor circuit 32 determines whether the microcomputer 10 has an abnormality not based on whether the monitor signal is input into the microcomputer 10, but based on whether the pulse cycle of the monitor signal has been changed.

For example, when the pulse cycle of the monitor signal becomes longer by 50% than the original pulse cycle, or when the pulse cycle becomes unfixed/arbitrary, the monitor circuit 32 determines that an abnormality has occurred in the microcomputer 10. Such a switching of determination criteria is performed by the signal input from the start circuit 31 to the monitor circuit 32.

The communication circuit 33 is the LIN transceiver as described above, and the communication signals is input from the microcomputer 10, without passing the signal to the start circuit 31. Further, the communication circuit 33 outputs the communication signals to the microcomputer 10, without passing the communication signals through the start circuit 31. The start circuit 31 has a wiring that is different from a wiring that connects the microcomputer 10 and the communication circuit 33, and the communication signals of the microcomputer 10 and the communication signals of the external ECU 300 are respectively input into the start circuit 31 via such wiring.

The power supply circuit 34 is the voltage regulator as described above, and changes the battery voltage of 12V to the fixed voltage of 5V, and outputs the fixed voltage of 5V to the microcomputer 10 and to the output circuit 20.

The switch 35 is disposed at a position between an output terminal of the power supply circuit 34 and the output circuit 20 as shown in FIG. 1, and controls an application of the fixed voltage of 5V to the output circuit 20. When the switch 35 is in a non-driving state, the output circuit 20 is put in an OFF state, and the control signal is no longer input to the actuator 200. Thus, it is possible to control the drive and the non-drive of the actuator 200 by controlling the driving state of the switch 35.

Next, the operation of the controller 100 concerning the present embodiment is described based on FIGS. 2-4.

FIG. 2 shows a state of each of various signals of the controller 100 together with the operation state of the microcomputer 10 and the monitor circuit 32 when the microcomputer 10 is normal. As shown in FIG. 2, when the dominant state is not input from the external ECU 300 (i.e., when the dominant state is not included in the communication signals), the start signal and the reset signal are both in Hi level, and the state signal, the drive signal, and the monitor signal are respectively in Lo level, and the drive voltage supplied to the output circuit 20 is the low voltage.

Further, the microcomputer 10 is in the low power mode, and the monitor circuit 32 is in the stop state.

However, when the dominant state is inputs from the external ECU 300 (i.e., the dominant state is included in the communication signals), the start circuit 31 changes the voltage level of the start signal from Hi level to Lo level, and controls the microcomputer 10 to perform the start process. Further, the start circuit 31 controls the monitor circuit 32 to transit from the stop state to the monitoring state.

After the start process is completed normally, the microcomputer 10 operates in the normal operation mode, and changes the voltage level of the state signal from Lo level to Hi level. Further, the microcomputer 10 generates the monitor signal and outputs the monitor signal to the monitor circuit 32. Further, the microcomputer 10 communicates with the external ECU 300 via LIN communication for examining the authorization ID, and controls the voltage level of the drive signal in Hi level. In such manner, the output circuit 20 is put in the ON state. When a release instruction of parking is input from the user in such state, the microcomputer 10 outputs, to the actuator 200 that is locking the ring gear, the control signal that instructs a release of the lock of the ring gear via the output circuit 20 that is in the ON state, for the release of the parking lock.

After ending LIN communication with the external ECU 300, the microcomputer 10 changes the voltage level of the drive signal from Hi level to Lo level, and puts the output circuit 20 in the OFF state. Then, the microcomputer 10 performs the end process, and, at the end of the end process, stops the output of the monitor signal while changing the voltage level of the state signal from Hi level to Lo level.

The start circuit 31 controls the monitor circuit 32 to transit to the stop state from the monitoring state, while changing the voltage level of the start signal from Lo level to Hi level when the voltage level of the state signal changes to Lo level (i.e., when the falling edge of the state signal is detected).

FIG. 3 shows a state of each of various signals of the controller 100 and the operation states of the microcomputer 10 and the monitor circuit 32 when the microcomputer 10 operates abnormally during the start process. As described above, when the dominant state is input from the external ECU 300 (i.e., when the dominant is included in the communication signals), the start circuit 31 controls the microcomputer 10 to perform the start process, and controls the monitor circuit 32 to transit to the monitoring state from the stop state.

However, as shown in FIG. 3, when the microcomputer 10 operates abnormally at the time of performing the start process, the microcomputer 10 may possibly output the dominant state to the external ECU 300. Under such circumstances, the monitor circuit 32 determines that an abnormality has occurred in the microcomputer 10, since the monitor circuit 32 does not receive the monitor signal even after the lapse of the start process time. After such a determination of abnormality, the monitor circuit 32 changes the voltage level of the reset signal to Lo level, to reset the microcomputer 10. After the input of the reset signal, the microcomputer 10 performs the start process, and transits to the normal operation mode.

FIG. 4 shows a state of each of various signals of the controller 100 and the operation state of the microcomputer 10 and the monitor circuit 32 when the microcomputer 10 operates abnormally in the low power mode. As described above, the microcomputer 10 performs the end process, after ending LIN communication with the external ECU 300, and, at the end of the end process, stops the output of the monitor signal while changing the voltage level of the state signal from Hi level to Lo level.

Further, when detecting the falling edge of the state signal, the start circuit 31 changes the voltage level of the start signal from Lo level to Hi level, and controls the monitor circuit 32 to transit from the monitoring state to the stop state.

However, as shown in FIG. 4, when the microcomputer 10 operates abnormally in the low power mode, the microcomputer 10 may possibly output the dominant state to the external ECU 300. If the dominant state is input to the start circuit 31, the start circuit 31 controls the monitor circuit 32 to transit from the stop state to the monitoring state, and changes the voltage level of the start signal from Hi level to Lo level. Under such circumstances, the monitor circuit 32 determines that an abnormality has occurred in the microcomputer 10, since the monitor circuit 32 does not receive the monitor signal even after the lapse of the start process time. After such a determination of abnormality, the monitor circuit 32 changes the voltage level of the reset signal to Lo level, for the resetting of the microcomputer 10. After the input of the reset signal, the microcomputer 10 performs the start process, and transits to the normal operation mode.

Next, the operation effects of the controller 100 concerning the present embodiment are described.

As described above, when the dominant state is included in the communication signals when the microcomputer 10 operates in the low power mode, the start circuit 31 puts the monitor circuit 32 in the monitoring state while outputting the start signal to the microcomputer 10.

In such case, if the monitor signal is not input from the microcomputer 10 even after the lapse of the start process time, the monitor circuit 32 determines that an abnormality has occurred in the microcomputer 10. Thus, even when the monitor signal is not input from the microcomputer 10, the abnormality of the microcomputer 10 in the low power mode is detectable.

Further, an abnormal state of the microcomputer 10 in which the microcomputer 10 does not start even after the input of the start signal is also detectable.

Further, another abnormal state such as a communication between a certain ECU in the external device 300 and the controller 100 continuously occupies an entire communication bandwidth as a result of a continuous output of the dominant state from the microcomputer 10 is prevented by. That is, communication over the LIN is always available for and guaranteed to the other ECU other than certain ECU in the external device 300.

The monitor circuit 32 is in the monitoring state when the microcomputer 10 is in the normal operation mode, or is performing the end process. In such a state, when the monitor signal is not input from the microcomputer 10 after the lapse of the preset time, the monitor circuit 32 determines that an abnormality has occurred in the microcomputer 10.

As described in details in the above, the abnormality of the microcomputer 10 is detectable in any one of the normal operation mode and the low power mode or during the start process and the end process, based on whether the monitor signal is input to the monitor circuit 32.

Therefore, the circuit configuration of the controller 100 is simplified compared with the configuration in which the monitor circuit 32 is provided separately for each of the normal operation mode after the lapse of the preset time and the low power mode of the microcomputer 10, for example.

When the monitor circuit 32 determines that an abnormality has occurred in the microcomputer 10, the voltage level of the reset signal is changed from Hi level to Lo level, and the microcomputer 10 is reset. After the input of the reset signal, the microcomputer 10 performs the start process, and transits to the normal operation mode. According to the above operation scheme, the microcomputer 10 recovers from the abnormal state to the normal operation, even when the microcomputer 10 is temporarily in the abnormal state. As a result, the microcomputer 10 is prevented from outputting erroneous communication signals to the external ECU 300, or is prevented from outputting an erroneous control signal to the actuator 200.

Although the present disclosure has been described in connection with the preferred embodiment thereof with reference to the accompanying drawings, it is to be noted that various changes and modifications will become apparent to those skilled in the art.

In the above-described embodiment, when the microcomputer 10 is operating in a mode other than the low power mode, the voltage level of the start signal is fixed to Lo level.

However, the voltage level of the start signal may also be changed to a level other than the above-described Lo level. For example, the voltage level of the start signal may be fixed to Lo level during a period between (i) an input of a dominant state that instructs a start of the microcomputer 10 from the external ECU 300 and (ii) an end of the start process of the microcomputer 10. Alternatively, the voltage level of the start signal may be fixed to Lo level during or during and after a period between (i) a detection of a dominant state in the communication signals and (ii) a time at which the microcomputer 10 is expected to finish the start process. Further, the voltage level of the start signal may be fixed to Lo level from the start of the start process due to an input of the reset signal to an end of the start process. Alternatively, the voltage level of the start signal may be fixed to Lo level from the start of the start process due to an input of the reset signal up to or even after a time at which the microcomputer 10 is expected to finish the start process.

That is, in other words, the Lo level fix period of the start signal may be variously defined as long as the start process of the microcomputer 10 is normally able to be completed.

In the above-described embodiment, the monitor circuit 32 is in the monitoring state when the microcomputer 10 is, without regard to the state of the communication signals coming in or going out from the microcomputer 10, i) in the normal operation mode, ii) is performing the start process, or iii) is performing the end process.

However, after the transition to the normal operation mode of the microcomputer 10 due to the start of the start process of the microcomputer 10, the monitoring state of the monitor circuit 32 monitoring the microcomputer 10 may be continued up to the change of the state signal changing from Lo level to Hi level. Alternatively, the monitoring state of the monitor circuit 32 may be continued from the transition to the normal operation mode of the microcomputer 10 due to the start of the start process of the microcomputer 10 up to or beyond an expected start time when the state signal is expected to change from Lo level to Hi level, which may also be designated as a first preset period.

The monitor circuit 32 outputs the reset signal to the microcomputer 10, when detecting that the microcomputer 10 is in the abnormal state. After the microcomputer 10 starts the start process and transits to the normal operation mode due to an input of the reset signal, the monitor circuit 32 may be put in the stop state when the state signal changes from Lo level to Hi level. Alternatively, after the microcomputer 10 starts the start process and transits to the normal operation mode due to an input of the reset signal, the monitoring state of the monitor circuit 32 may be maintained up to or beyond an expected reset time when the state signal is expected to change from Lo level to Hi level, which may also be designated as a second preset period.

In either of the above cases, in comparison to the always-monitoring operation scheme that always puts the monitor circuit 32 in the monitoring state when the microcomputer 10 i) is in the normal operation mode, ii) is performing the start process, or iii) is performing the end process, the power consumption by the monitoring circuit 32 is reduced.

The above-mentioned first and second preset period may be a period of time about 10 folds of the above-mentioned expected start/reset time.

In the above-described embodiment, the start circuit 31 controls the monitor circuit 32 to transit to the monitoring state based on the communication signals. However, the start circuit 31 may control the monitor circuit 32 to transit to the monitoring state based at least on one of the communication signals and the drive signal.

Figure 5:
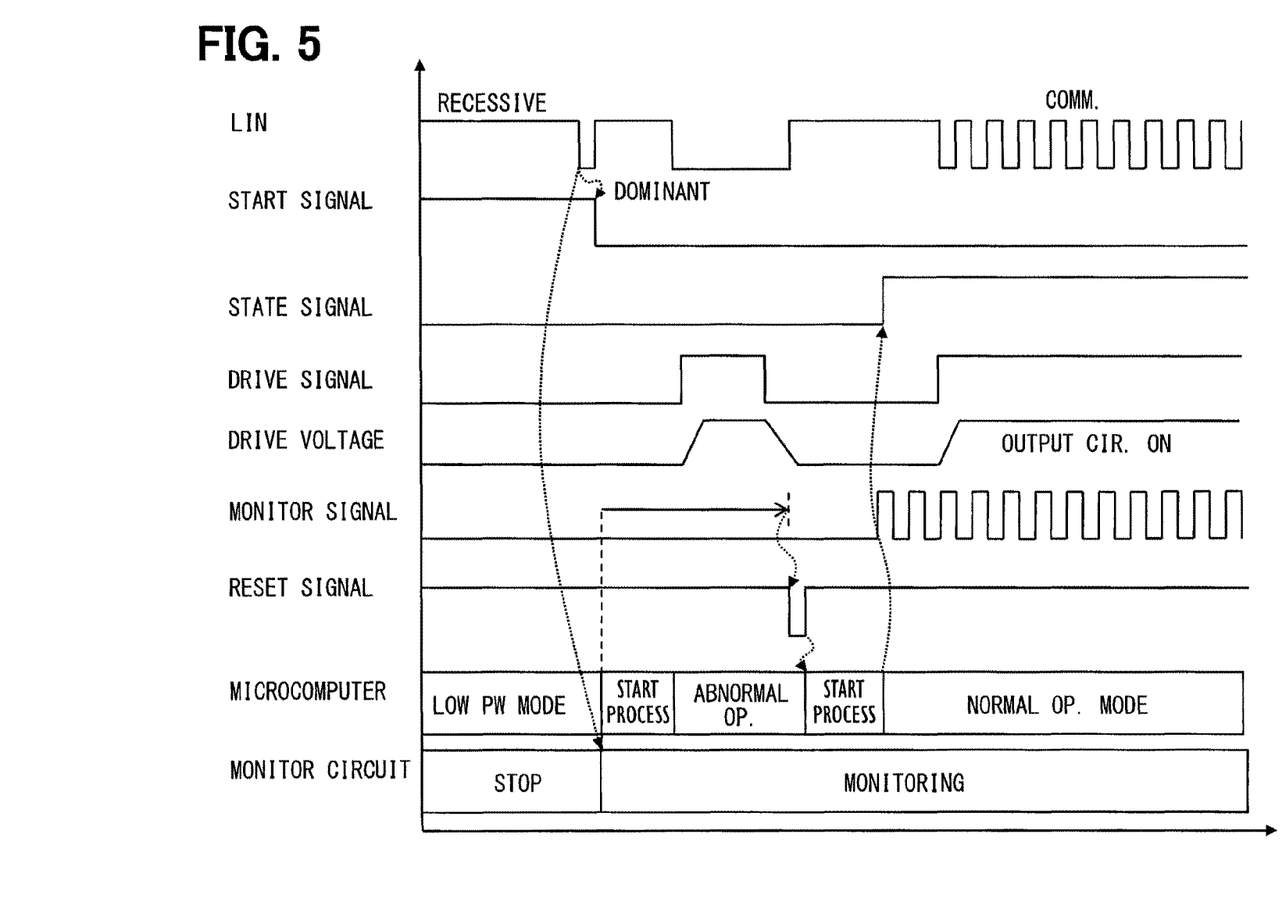
FIG. 5 is a timing chart of having a drive signal input during an abnormal operation time of a microcomputer in FIG. 3 in which a drive voltage is raised.
Figure 6:
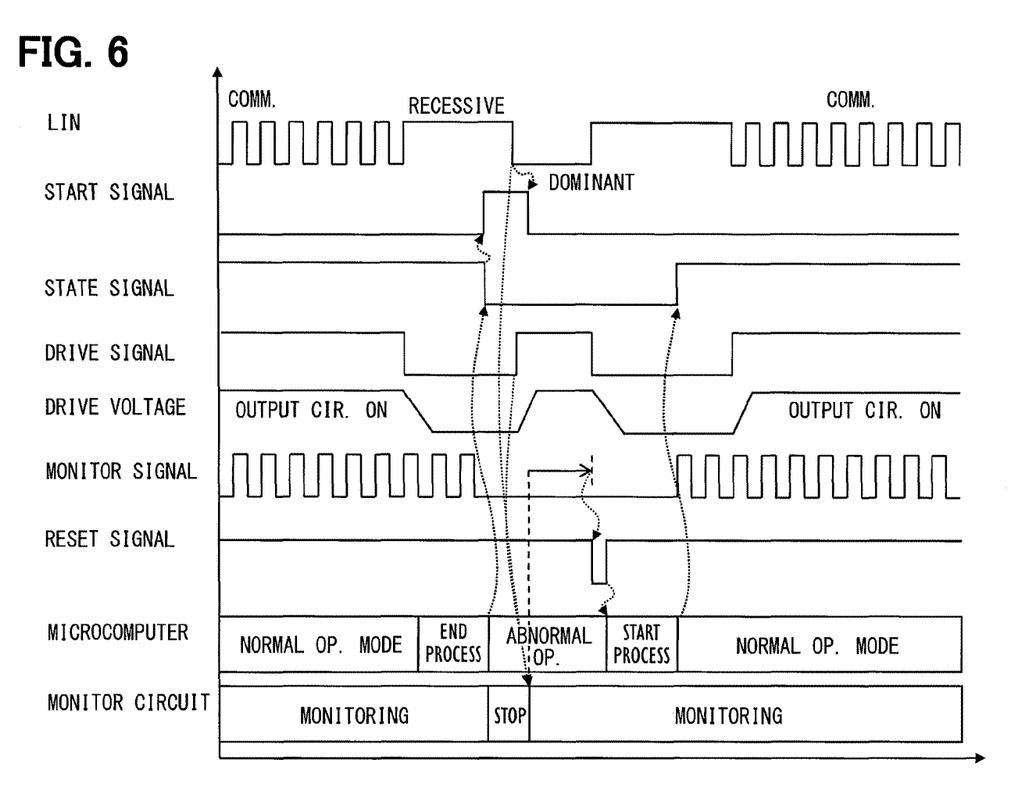
FIG. 6 is a timing chart of having a drive signal input during an abnormal operation time of a microcomputer in FIG. 4 in which the drive voltage is raised.

As shown in FIGS. 5 and 6, depending on the abnormal state of the microcomputer 10, the drive signal may be outputted from the microcomputer 10 (i.e., the voltage level of the drive signal changing to Hi level) and the drive voltage may go up and the output circuit 20 may be switched to the ON state. In such case, the actuator 200 may operate according to the control signal outputted from the microcomputer 10 that is operating in the abnormal state.

Therefore, as a modification of the controller 100 in the above-described embodiment, the start circuit 31 controls the monitor circuit 32 to transit to the monitoring state when the voltage level of the drive signal is in Hi level. In such case, when no monitoring signal is input after the lapse of a preset time of 30 msec or more, the monitor circuit 32 determines that an abnormality has occurred in the microcomputer 10.

According to such determination scheme, whether the control signal outputted from the microcomputer 10 in the abnormal state is input to the actuator 200 is determinable.

Further, in a comparison case that the abnormality of the microcomputer 10 is configured to be detected based on the control signal, for example, an error-prone control signal may keep on coming into the monitor circuit 32 while the monitor circuit 32 is busy determining whether the already-received control signal indicates abnormality, which may cause the actuator 200 to perform an unintended operation according to such an error-prone control signal.

However, the modification of the controller 100 described above detects the abnormality of the microcomputer 10 based on the drive signal instead of the control signal. Since the input of the control signal to the actuator 200 happens after the switching of the output circuit 20 to the ON state according to the drive signal. Therefore, in comparison to the configuration of the comparison case described above, a continuation time of the input of the error-prone control signal is reduced in the modification configuration of the controller 100.

Both of FIGS. 5 and 6 illustrate a situation in which the start circuit 31 puts the monitor circuit 32 in the monitoring state based on each of the communication signals and the drive signal. In FIGS. 5 and 6, the start circuit 31 controls the monitor circuit 32 to transit to the monitoring state while outputting the start signal, since a dominant state is included in the communication signals. When in the monitoring state, the monitor circuit 32 in FIG. 5 determines that an abnormality has occurred in the microcomputer 10 when no monitor signal is input to the monitor circuit 32 for more than the start process time after an input of the start signal for starting the start process of the microcomputer 10, just like the above-described embodiment. Alternatively, the monitor circuit 32 in FIG. 6 determines that an abnormality has occurred in the microcomputer 10 when, during the low power mode of the microcomputer 10, no monitor signal is input to the monitor circuit 32 for more than the start process time after an input of the start signal for starting the start process of the microcomputer 10. Even though not illustrated, when the microcomputer 10 is in the normal operation mode or is performing the end process, the monitor circuit 32 determines, in the same manner as the above-described two situations, that an abnormality has occurred in the microcomputer 10 when no monitor signal is input to the monitor circuit 32 for more than the start process time.

In the above-described embodiment, the controller 100 is applied to a control ECU that controls an actuator of a parking switch in the vehicle.

However, the application of the controller 100 is not limited to the above. That is, the controller 100 may be applicable to any consumer product that is subject to a problem of detecting an abnormality of the microcomputer when no monitoring signal is output from the microcomputer in the low power mode.

In the above-described embodiment, the controller 100 and the external ECU 300 communicate with each other via LIN communication.

However, a communication protocol between the controller 100 and the external ECU 300 is not limited to the above. That is, for example, the communication between the controller 100 and the external ECU 300 may be performed as CAN communication.

The power supply IC 30 is described as having the normal operation mode and the low power mode.

However, the power supply IC 30 may always operate in the normal operation mode.

In the above-described embodiment, the voltage level of the state signal is in Hi level when the microcomputer 10 is operating in the normal operation mode, and is in Lo level when the microcomputer 10 is put in the low power mode.

However, contrary to the above configuration, the voltage level of the state signal may be in Lo level when the microcomputer 10 is operating in the normal operation mode, and may be in Hi level when the microcomputer 10 is put in the low power mode.

In the above-described embodiment, the microcomputer 10 is configured to generate the state signal, which is indicative of whether the microcomputer 10 is in the normal operation mode or in the low power mode.

However, the microcomputer 10 does not have to generate the state signal.

In the above-described embodiment, when the microcomputer 10 is in the normal operation mode, the voltage level of the state signal is in Hi level, and when the microcomputer 10 is in the low power mode, the voltage level of the state signal is in Lo level.

However, contrary to the above, when the microcomputer 10 is in the normal operation mode, the voltage level of the state signal may be in Lo level, and when the microcomputer 10 is in the low power mode, the voltage level of the state signal may be in Hi level.

In such case, the voltage level of the state signal is in Lo level when the microcomputer 10 is performing the end process, and is in Hi level when the microcomputer 10 is performing the start process.

In the above-described embodiment, the power supply IC 30 includes the switch 35.

However, the power supply IC 30 does not have to have the switch 35. In such case, the microcomputer 10 does not generate the drive signal.

In the above-described embodiment, when the voltage level of the drive signal changes from Lo level to Hi level, the switch 35 is put in the driving state.

However, contrary to the above, when the voltage level of the drive signal changes from Hi level to Lo level, the switch 35 may be put in the drive state.

In the above-described embodiment, the microcomputer 10 controls the operation of the actuator 200.

However, the microcomputer 10 does not have to control the operation of the actuator 200. Therefore, in such case, the controller 100 does not have to have the output circuit 20.

In the above-described embodiment, the monitor signal is the watch dog signal having the fixed pulse cycle and the fixed duty ratio.

However, the monitor signal is not necessarily limited to the above. That is, the monitor signal may be a signal that includes an instruction for performing a simple arithmetic operation from the microcomputer 10 to the monitor circuit 32. Further, the monitor signal may be a pulse signal having the fixed pulse cycle but an arbitrary duty ratio. In either case, the abnormality of the microcomputer 10 is determinable by monitoring an output of the monitor signal from the abnormal-state microcomputer 10.

In the above-described embodiment, the reset signal is input to the microcomputer 10 from the monitor circuit 32.

However, the reset signal may be input to the microcomputer 10 from the start circuit 31. In such case, the monitor circuit 32 outputs information regarding the abnormality of the microcomputer 10 to the start circuit 31, when the abnormality of the microcomputer 10 is detected. When receiving such information from the monitor circuit 32, the start circuit 31 outputs the reset signal to the microcomputer 10.

Such changes, modifications, and summarized scheme are to be understood as being within the scope of the present disclosure as defined by appended claims.

What is claimed is:

1. A controller comprising:
   a microcomputer operating in a normal operation mode and a low power consumption mode consuming less electric power than the normal operation mode and communicating with an external device;
   a monitor circuit monitoring an operation state of the microcomputer; and
   a start circuit controlling a drive of the monitor circuit, wherein
   the microcomputer generates and outputs a pulse shape monitor signal in the normal operation mode to the monitor circuit, the pulse shape monitor signal indicating that the operation state of the microcomputer is normal,
   the monitor circuit monitors the operation state of the microcomputer based on the monitor signal,
   pulse shape communication signals exchanged for communication between the microcomputer and the external device are in a dominant state or a recessive state, the dominant state of a communication signal indicating that the communication signal is a signal of significance and the recessive state of the communication signal being continuously output when the communication is stopped,
   the start circuit monitoring the pulse shape communication signals puts the monitor circuit in a monitoring state when the pulse shape communication signals in the low power consumption mode of the microcomputer include the dominant state, and
   the monitor circuit in the monitoring state determines that an abnormality has occurred in the microcomputer when no monitor signal is input to the monitor circuit.

2. The controller of claim 1, wherein
   when the microcomputer is in the low power consumption mode and the communication signals include the dominant state, the start circuit (i) outputs a start signal to the microcomputer, the start signal instructing an execution of a start process for a transition of the microcomputer from the low power consumption mode to the normal operation mode, and (ii) puts the monitor circuit in the monitoring state, and
   when the monitor circuit in the monitoring state receives no monitor signal for at least a start process time that is required for completing the start process of the microcomputer from an output of the start signal to the microcomputer, the monitor circuit determines that that the abnormality has occurred in the microcomputer.

3. The controller of claim 2 further comprising:
   an output circuit outputting a control signal from the microcomputer to an external element; and
   a power circuit supplying a drive voltage to the output circuit, wherein
   the microcomputer in the normal operation mode controls an operation of the external element by outputting the control signal to the external element as well as communicating with the external device,
   a supply of the drive voltage to the output circuit is controlled by a power signal that is output from the microcomputer to the power circuit, and
   the start circuit puts the monitor circuit in the monitoring state based at least on one of the communication signal and the power signal.

4. The controller of claim 3, wherein
   the start circuit puts the monitor circuit in the monitoring state when the supply of the drive voltage to the output circuit is enabled based on the power signal, and
   when the monitor circuit in the monitoring state receives no monitor signal, the monitor circuit determines that the abnormality has occurred in the microcomputer.

5. The controller of claim 2, wherein
   the microcomputer generates and outputs the monitor signal to the monitor circuit when operating in the normal operation mode, and when performing an end process of the microcomputer for a transition from the normal operation mode to the low power consumption mode,
   the start circuit puts the monitor circuit in the monitoring state when the microcomputer is performing the end process, and
   the monitor circuit determines that the abnormality has occurred in the microcomputer when the monitor circuit receives no monitor signal.

6. The controller of claim 5, wherein
   the start circuit puts the monitor circuit in the monitoring state when the microcomputer is operating in the normal operation mode, and
   the monitor circuit determines that the abnormality has occurred in the microcomputer when the monitor circuit receives no monitor signal.

7. The controller of claim 6, wherein
the microcomputer generates a state signal that indicates that the microcomputer is either in the normal operation mode or in the low power consumption mode, and
the start circuit determines the operation state of the microcomputer based on the state signal.

8. The controller of claim 7, wherein
when the microcomputer is performing the end process, the microcomputer generates the state signal that indicates that the microcomputer is in the normal operation mode.

9. The controller of claim 7, wherein
when the microcomputer is performing the start process, the microcomputer generates the state signal that indicates that the microcomputer is in the low power consumption mode.

10. The controller of claim 7, wherein
the monitor circuit maintains the monitoring state (i) during a start period from a monitor start time when the monitor circuit inputs the start signal to the microcomputer and switches during the monitoring state to a state signal reception time when the state signal that indicates that the microcomputer is in the normal operation mode is output from the microcomputer to the monitor circuit or (ii) during a first preset period that is equal to or longer than an expected start period.

11. The controller of claim 10, wherein
when the monitor circuit determines that the abnormality has occurred in the microcomputer, the monitor circuit outputs a reset signal to the microcomputer for controlling the microcomputer to perform the start process.

12. The controller of claim 11, wherein
the monitor circuit maintains the monitoring state (i) during a reset period from an output of the reset signal from the monitor circuit to the microcomputer to an output of the state signal from the microcomputer to the monitor circuit, the state signal indicative of the microcomputer being in the normal operation mode, or (ii) during a second preset period that is equal to or longer than an expected reset period.

13. The controller of claim 7 further comprising:
a communication circuit communicating with the external device, wherein
the microcomputer performs communication with the external device via the communication circuit,
the communication circuit operates in the normal operation mode or in the low power consumption mode,
the communication circuit in the low power consumption mode transits to the normal operation mode when the communication signals that are output from the external device include the dominant state, and
the communication circuit in the normal operation mode transits to the low power consumption mode when the state signal that indicates that the microcomputer is in the low power consumption mode is input to the communication circuit.

14. The controller of claim 1, wherein
the microcomputer does not generate and does not output the pulse shape monitor signal in the low power consumption mode to the monitor circuit.

15. The controller of claim 1, wherein
the microcomputer communicates with the external device over the Local Interconnect Network.

* * * * *